United States Patent [19]

Geier

[11] Patent Number: 5,928,295
[45] Date of Patent: Jul. 27, 1999

[54] METHOD AND APPARATUS FOR AUTOMATIC CALIBRATION OF THE WHEEL TRACK OF A MOVABLE VEHICLE

[75] Inventor: George Jeffrey Geier, Scottsdale, Ariz.

[73] Assignee: Motorola, Inc., Schaumburg, Ill.

[21] Appl. No.: 08/767,556

[22] Filed: Dec. 16, 1996

[51] Int. Cl.⁶ .................................................. G06F 19/00
[52] U.S. Cl. ............................................ 701/29; 701/205
[58] Field of Search ................................. 701/29, 31, 205, 701/207, 213, 216, 217

[56] References Cited

U.S. PATENT DOCUMENTS

| | | | |
|---|---|---|---|
| 4,734,863 | 3/1988 | Honey et al. | 701/207 |
| 4,788,645 | 11/1988 | Zavoli et al. | 701/207 |
| 5,156,038 | 10/1992 | Kozikaro | 73/1.79 |
| 5,684,476 | 11/1997 | Anderson | 701/213 X |

Primary Examiner—William A. Cuchlinski, Jr.
Assistant Examiner—Ed Pipala
Attorney, Agent, or Firm—Bradley J. Botsch, Sr.

[57] ABSTRACT

This invention reduces the navigation error associated with the use of wheel sensor based DR as an augmentation to GPS. In order to derive accurate heading information from the wheel speeds, the distance between the centers of the tires, or the wheel track, must be known to high precision. Unfortunately, the wheel track may not be precisely known whereby different classes of the same vehicle type can produce variations of up to 5%. The current invention removes the error growth associated with wheel track error by automatically estimating and calibrating the wheel track. The wheel track is measured by computing a heading rate directly from the GPS Doppler measurements, and comparing it with the heading rate derived from the wheel sensors whereby subsequent refinements to the estimated wheel track are computed by filtering each measured track.

22 Claims, 3 Drawing Sheets

METHOD AND APPARATUS FOR AUTOMATIC CALIBRATION OF THE WHEEL TRACK OF A MOVABLE VEHICLE

BACKGROUND OF THE INVENTION

Use of global positioning satellite (GPS) receivers in automotive navigation, emergency messaging, and tracking systems is now widespread. However, systems based solely on GPS generally do not work well in dense city environments, where signal blockage and reflection by tall buildings, in addition to radio frequency interference, often occurs. A cost effective solution to this problem is to augment the GPS receiver with some form of Dead Reckoning (DR), to fill in the gaps occurring as a result of loss of GPS coverage and improve the accuracy of the GPS trajectory.

A DR system may take the form of an interface to separate left and right wheel sensors installed in the vehicle to provide an indication of the speed of each wheel. The average speed of each wheel is used to determine the vehicle velocity, and the wheel speed difference divided by the distance between the wheels (referred to as the wheel track) is used to determine changes in the vehicle heading. The accuracy of the DR system is critically dependent upon the accuracy to which the vehicle's heading is determined whereby each degree of heading error, in the absence of GPS, produces a cross-track position error which grows approximately as 1.7% of distance traveled.

However, in order to derive accurate heading information from the speed of each wheel, the distance between the centers of the tires, or the wheel track, must be known to high precision whereby an error of 1% is generally acceptable, since it produces roughly one degree of heading error each time the vehicle turns a corner (i.e., changes its heading by ninety degrees). Unfortunately, the wheel track may not always be known to this level of accuracy. Further, different classes of the same vehicle type can produce variations of up to 5%, which produces significant navigation error when GPS positioning is lost. For example, a 5% error in the wheel track will produce nearly ten meters of cross track position error every one hundred meters of travel following a reversal of the vehicle's direction (i.e., a one hundred eighty degree turn). Thus, the wheel track must be known to a high level of precision for each vehicle in which the wheel sensor based DR system is installed. This places an undesirable burden on the vehicle manufacturer, since the DR system must be informed of the vehicle type and class, or have the wheel track value input directly.

Thus, a method of estimating the wheel track of a vehicle to a high level of accuracy is needed.

DETAILED DESCRIPTION OF THE DRAWINGS

The present invention provides a method and apparatus of estimating the distance between the wheels (known as the wheel track) of a movable vehicle to a high degree of accuracy. The present invention removes the error growth associated with wheel track error in DR systems by utilizing wheel sensors, in conjunction with GPS data, to automatically estimate and calibrate the wheel track. In estimating the wheel track, the error buildup associated with its imperfect knowledge is removed, and variations in wheel track associated with different vehicle types and classes may be tolerated. Briefly, the wheel track is measured by computing a heading rate directly from the GPS data and comparing it with the heading rate derived from the wheel sensors whereby subsequent refinements to the estimated wheel track are computed by filtering each measured wheel track.

Figure 1:
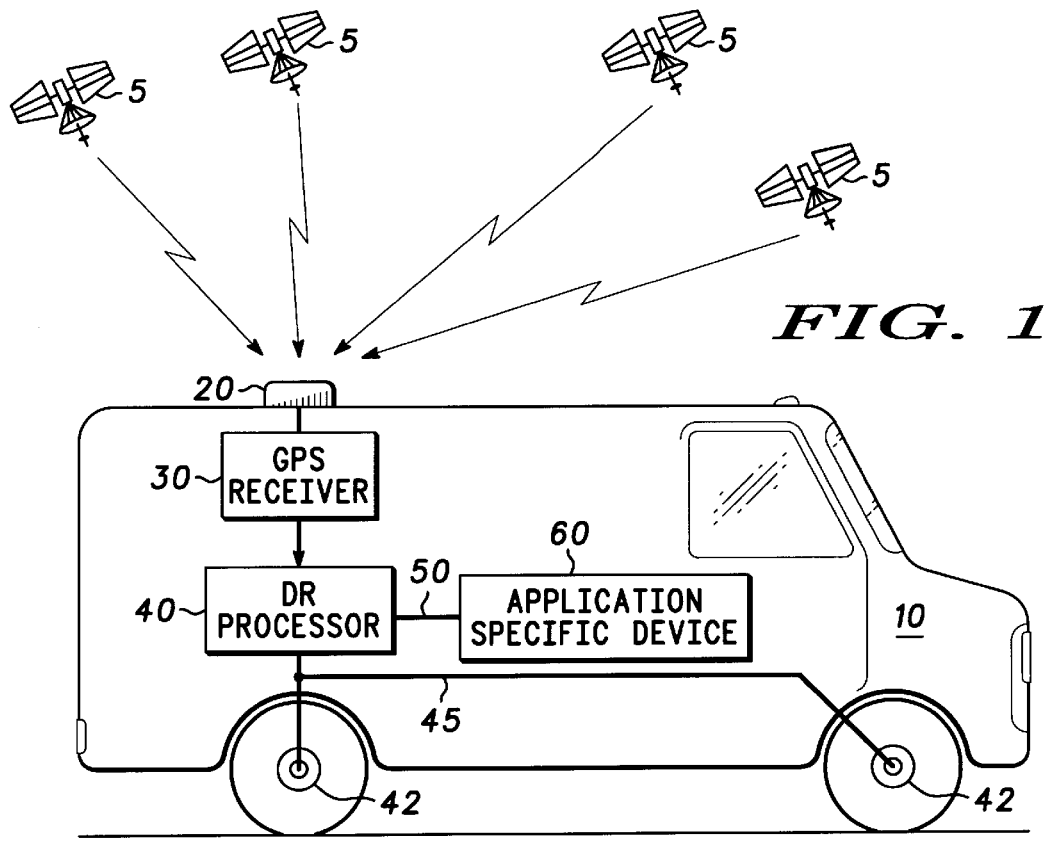
FIG. 1 is a block diagram illustrating components of a GPS and DR system installed in a movable vehicle.

Referring to FIG. 1, a block diagram illustrating components of a GPS and DR navigation system installed in a movable vehicle 10 is shown. FIG. 1 includes DR processor 40 and GPS receiver 30 that is coupled to a GPS antenna 20, all of which are suitable for installation in movable vehicle 10. FIG. 1 also includes wheel sensors 42 that are coupled to the wheels of movable vehicle 10 for obtaining wheel speed data and providing such data to DR processor 40 via signal lines 45. Sensors 42 are typically installed on the non-driven wheels of vehicle 10 and, thus, may be installed in either the front or rear wheels of vehicle 10 depending upon whether the vehicle is rear wheel drive or front wheel drive, respectively. Further, although the use of sensors 42 on non-driven wheels is preferred to reduce the effects of wheel skidding that more prominently occurs with the driven wheels, sensors 42 may be installed on both the front and rear wheels of vehicle 10 whereby benefits may be derived from use of speed data from all four wheels.

Also shown in FIG. 1 are a plurality of GPS satellites 5 for generating GPS signals that are received by the GPS receiver 30 for enabling GPS receiver 30 to determine the position of movable vehicle 10 in a well known manner. Generally, four satellites are required for enabling GPS receiver 30 to obtain a three-dimensional position fix for vehicle 10.

DR processor 40, which may be embedded in the GPS receiver, receives GPS data 35, such as Doppler or heading measurements, from GPS receiver 30, and accepts wheel speed data 45 from wheel sensors 42. The DR processor 40 also outputs the integrated position data 50 to an application specific device 60. For vehicle navigation applications, application specific device 60 may be a separate processor which implements a map matching algorithm to locate the vehicle on the correct street and to generate a display visible to the driver. For emergency messaging and vehicle tracking applications, application specific device 60 may provide the necessary interface to a cellular phone or radio for establishing a communication link to proper third parties thereby informing such third parties of the location of movable vehicle 10.

Figure 2:
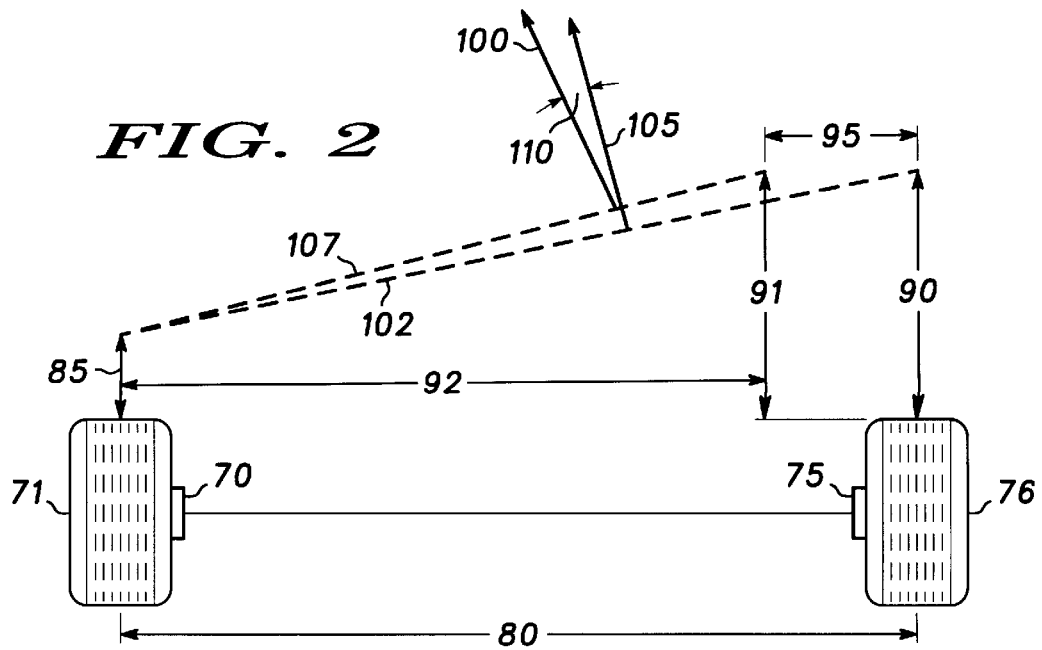
FIG. 2 is an illustration of the effect of wheel track error upon vehicle heading determination, thereby demonstrating a need for the present invention.

FIG. 2 is a detailed pictorial diagram illustrating the heading rate determination of a DR system using left 70 and right 75 wheel speed sensors and the corresponding error that is introduced by an error in knowledge of the actual (true) wheel track distance 80. In a preferred embodiment, sensors 70 and 75, similar to sensors 42 of FIG. 1, are coupled to wheels 71 and 76, respectively, of movable vehicle 10 whereby wheels 71 and 76 may represent the front or rear wheels of a movable vehicle. Further, although non-driven wheel installations are preferred, due to the reduced potential for wheel slippage, both driven and non-driven wheel installations are possible, and the error induced by imperfect knowledge of the wheel track is the same for each.

FIG. 2 demonstrates the effect that a wheel track error 95 of movable vehicle 10 has on a determined heading of that vehicle whereby wheel track error 95 represents the error between the nominal wheel track 92 (one that is initially supplied or estimated) and the actual wheel track 80 of movable vehicle 10. Wheel track error 95 may be, for example, the error supplied by the vehicle manufacturer, or an error in a value that is assumed. It is worth noting that the wheel track error 95 illustrated in FIG. 2 is intentionally exaggerated to highlight its effect upon vehicle heading error 110.

The heading of movable vehicle 10 is determined by the distances traveled by the left 85 and right 90 wheels via wheel sensors 70 and 75 whereby the motion of the movable vehicle according to FIG. 2 corresponds to a left turn of the vehicle because the distance traveled by the left wheel 85 is less than the distance traveled by the right wheel 90. The distance 91 represents the distance traveled by and the placement of the right wheel in accordance with the nominal or assumed wheel track distance 92. Distance 90, which is equal to distance 91, represents the distance traveled by and the placement of the right wheel in accordance with the actual wheel track distance 80 and produces a different location for the right tire 76 when compared with the placement of the right wheel for the nominal wheel track distance.

The true heading (105) of the vehicle may be determined from the perpendicular to the dashed line 102 connecting the new position of the left wheel to the new position of the left wheel in accordance with the actual wheel track distance. Similarly, the estimated heading 100 is determined from the perpendicular to the dashed line 107 connecting the new position of the left wheel to the new position of the left wheel in accordance with the nominal wheel track distance. As a result, due to the wheel track error 95, a heading error 110 results as determined by the difference between the true heading 105 and the estimated heading 100 of the vehicle.

As can be clearly seen from FIG. 2, a wheel track error directly contributes to a heading error. Accordingly, it would be desirable to be able to accurately determine the wheel track of a movable vehicle in order to improve heading information derived from a DR system. To that end, the present invention provides a method and apparatus for accurately determining the calibrating the wheel track error and thereby substantially improve the determined heading of a DR system.

Figure 3:
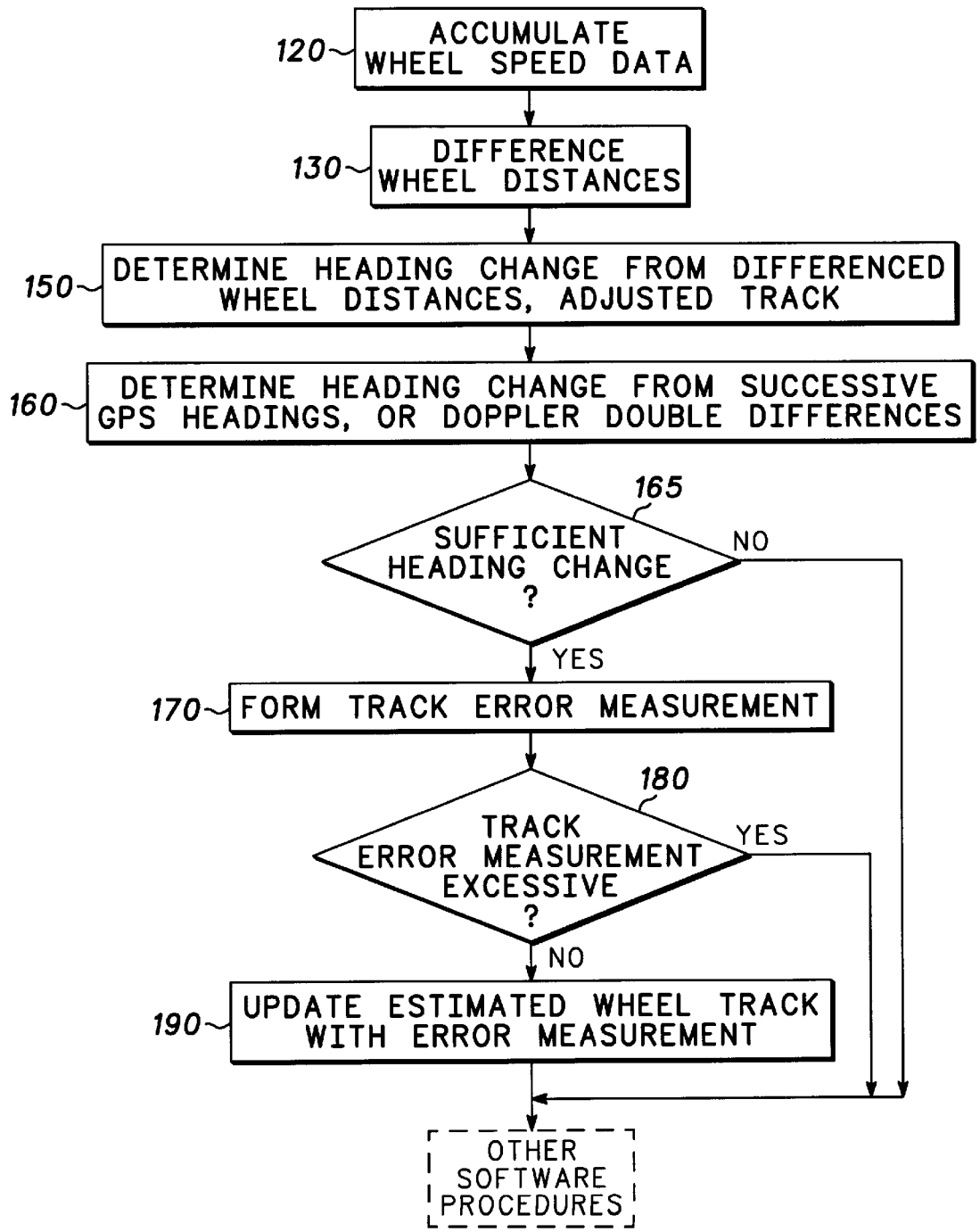
FIG. 3 is a detailed flowchart illustrating the processing steps for calibrating the wheel track of a movable vehicle in accordance with a preferred embodiment of the present invention.

Referring to FIG. 3, a detailed flow chart 115 is shown illustrating the steps performed by DR processor 40 in deriving heading change information from wheel sensors 70 and 75 and collecting GPS related data from GPS receiver 30 for use in determining and calibrating the wheel track (80) of movable vehicle 10.

First, the wheel sensor data from sensors 70 and 75 is accumulated, as represented by box 120. The raw wheel sensor data is generally available as discrete pulses, with each pulse representing a minimum detectable tire distance, typically a few centimeters. These pulses are summed over a predetermined time interval, for example, one second which is synchronous with the GPS measurement data. Thus, a calculation of the distance traveled by each wheel over the last GPS second is performed.

Next, the difference, $\Delta d$, between the distance traveled by the left and right wheels is determined, as represented by box 130.

The vehicle heading change can then be found using the adjusted track and the wheel distance difference, as represented by box 150, and given by Eqn. (1) below:

$$\Delta H_w = \Delta d / \text{Track}_{est} \quad (1)$$

where $\text{Track}_{est}$ is the current estimate of the wheel track which is initially given a nominal or assumed value.

This DR heading change ($\Delta H_w$) is then utilized, with collected GPS heading data ($\Delta H_{GPS}$), as shown in box 160, in measuring the error in the nominal (estimated) wheel track ($\text{Track}_{err}$), as represented by box 170 and Eqn. (2). GPS heading data $\Delta H_{GPS}$ may be determined from Doppler measurements, as described in more detail hereinafter with reference to FIG. 4, or by simply differencing successive GPS heading information.

$$\text{Track}_{err} = \text{Track}_{est}[1 - (\Delta H_w / \Delta H_{GPS})] \quad (2)$$

where:

$\text{Track}_{err}$ is a measurement of the wheel track error;

$\Delta H_w$ is the heading change sensed using the current estimated wheel track and the sensed pulse count differences; and $\Delta H_{GPS}$ is the heading change determined from GPS information.

As can be seen from Eqn. (2), an estimate in the wheel track error ($\text{Track}_{err}$) is obtained that is based upon the initial (or current) estimate of the wheel track as refined by the determined DR and GPS headings.

However, prior to determining the track error, a test is made to verify that a sufficient heading change has occurred, as represented by box 165. A minimum heading change of 0.2 radians (roughly ten degrees) is required to estimate the wheel track error, and is imposed. Heading changes below this level cannot be used effectively in Eqn. (2), since the errors in the GPS sensed heading change produce large errors in the track error measurement $\text{Track}_{err}$.

Following calculation of the error in the wheel track (box 170), a test is performed, as represented by box 180, to determine whether the determined wheel track error is reasonable only if the measured error magnitude is less than the expected variability of wheel track across vehicle types and classes, then the wheel track error is used to update the current value of the estimate of the wheel track, as in Eqn. (3).

$$\text{Track}_{est} = \text{Track}_{est} + k_{track} \text{Track}_{err} \quad (3)$$

where:

$\text{Track}_{est}$ is the current value for the track estimate; and $k_{track}$ is the gain used to update the track estimate.

The gain used to update the estimated track can be set to a relatively low value to permit filtering of the errors associated with the GPS Heading or Doppler measurements, or can be set as a function of the expected accuracy of the track measurement (i.e., a Kalman filtering approach). For the Kalman filter approach, the gain which is applied to $\text{Track}_{err}$ is computed each second that the track calibration is active, and will reflect the expected accuracy of the GPS determined heading change over the current second, as a function of the vehicle speed, the satellite geometry, and the expected error in the GPS Doppler measurements.

Figure 4:
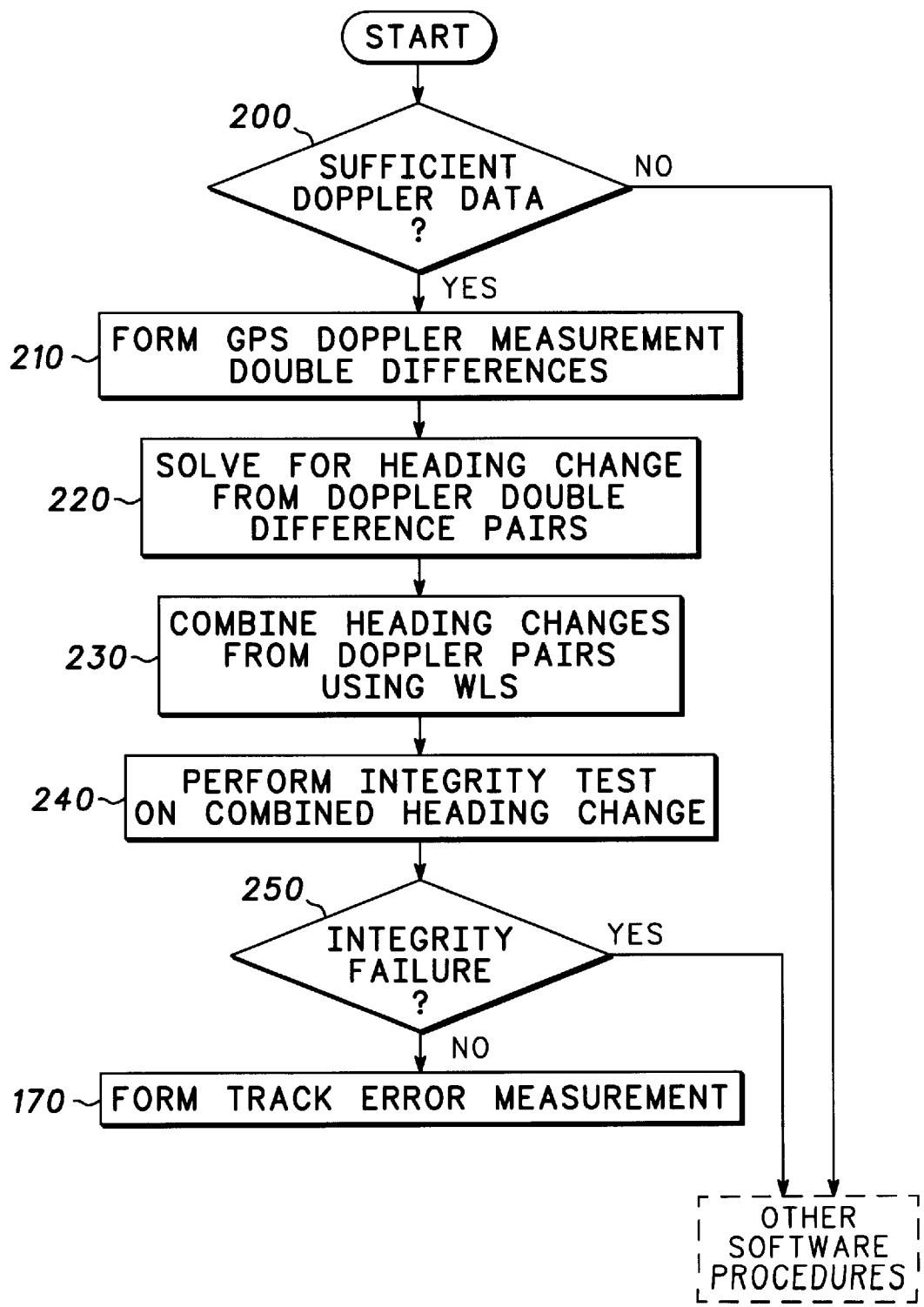
FIG. 4 is a detailed flowchart illustrating the processing steps for estimating heading change of a movable vehicle using GPS Doppler double differences in accordance with a preferred embodiment of the present invention.

Referring now to FIG. 4, a detailed flowchart 201 is shown illustrating how the GPS Doppler measurements are used to estimate the GPS determined heading change $\Delta H_{GPS}$ in accordance with the wheel track calibration method of FIG. 3. Note that, as mentioned above, the GPS heading change can alternatively be derived by simply differencing successive GPS headings. However, it is expected that the approach which is based on Doppler double differences will be more accurate, since maximum use is made of all available data in forming the estimate, including the vehicle speed estimate derived from the wheel speeds.

Eqn. (4) expresses the relationship between the Doppler double differences and the (to-be-determined) heading change Δ H. Thus, the heading change determined using Eqn. (4) represents a best estimate of heading change, using the available GPS Doppler measurements, and vehicle speed derived from the wheel sensors. This heading change is used only for the purposes of the track calibration, i.e., it is not used in dead reckoning equations, for example, in Eqn. 1.

$$\delta \Delta Dopp_{res} = \Delta v \cos \Delta H \, \Delta v_{factor} - v \sin \Delta H \, \Delta H_{factor} \quad (4)$$

where:

Δv is the sensed speed change;

ΔH is the heading change;

$\Delta v_{factor} = \cos E_i \cos dAz_i - \cos E_j \cos dAz_j$;

v is the speed at the previous second;

$\Delta H_{factor} = \cos E_i \sin dAz_i - \cos E_j \sin dAz_j$;

Ei, Ej are the satellite elevation angles;

dAz=H−Az;

Azi, Azj are the satellite azimuth angles; and

H is the heading at the previous second.

Given that a sufficient number of Doppler measurements are available, as represented by box 200, the variable $\delta \Delta Dopp_{res}$ in Eqn. 4 is formed by differencing the Doppler differences between two GPS satellites over successive seconds according to Eqn. 5, as represented by box 210.

$$\delta \Delta Dopp_{res} = (Dopp_{res}{}^i - Dopp_{res}{}^j)k - (Dopp_{res}{}^i - Dopp_{res}{}^j)k-1 \quad (5)$$

where:

i, j denote satellites indices; and k denotes seconds.

Double differencing of the Doppler measurements removes the contribution of user clock frequency error and selective availability, and so permits accurate determination of heading change using GPS at relatively low speed.

Equation 3 represents a nonlinear equation in ΔH which needs to be solved, as represented by box 220. The solution method begins by assuming that the heading change is a small angle (vehicle heading rates are generally limited to 40 degrees/sec), which permits simplification of Eqn. 3 to the one shown in Eqn. 6.

$$\delta \Delta Dopp_{res} = \Delta v \, \Delta v_{factor} - v \, \Delta H \, \Delta H_{factor} \quad (6)$$

Since Eqn. 5 is linear in ΔH, a direct solution is possible. However, for a maximum ΔH of 40 degrees, the second order term embedded in cos ΔH in Eqn. 4 may be significant. Inclusion of this term results in a quadratic equation for the heading change, with two solutions. Selection of the appropriate solution from these is done simply by selecting the nonlinear solution which is closest to the linear solution derived from Eqn. 3. Thus, each pair of GPS satellites can be used to estimate the current heading change.

Since more than a single pair of Doppler measurements will generally be available, a method of combining heading change estimates from multiple pairs is required whereby the use of a Weighted Least Squares (WLS) approach is preferred, as represented by box 230, since it attaches greater weight to the more accurate heading change estimates. A characterization of the accuracy of each heading change estimate is therefore required. Eqn. 7 represents an expression for the error associated with the linear solution, as a function of the expected accuracy of the Doppler measurements, the accuracy to which acceleration can be determined, and the expected variation from a level trajectory.

$$\sigma^2_{\Delta H} = \{2(\sigma^2_{PRR}{}^i \sigma^2_{PRR}{}^j) + \sigma^2_{OSF} \Delta v^2 \Delta v_{factor}^2 + \Delta \sin E^2 (\Delta v^2 \sigma_M^2 + v^2 \sigma_{\Delta M}^2)\}/v^2 \Delta H_{factor}^2 \quad (7)$$

where:

$\sigma^2_{PRR}{}^i$=ith satellite Doppler measurement noise variance;

$\sigma^2_{OSF}$=odometer scale factor error variance;

$\Delta \sin E = \sin E_i - \sin E_j$;

$\sigma_M^2$=variance associated with road slope;

and $\sigma_{\Delta M}^2$=variance associated with road slope change.

In forming the WLS estimate, each heading change estimate is weighted inversely by its error variance, as expressed by Eqn. 6. An error variance for the WLS estimate can then be computed directly from the weights and the individual variances.

Given the WLS estimate for heading change and its error variance, a consistency test is applied, as represented by box 240, when redundancy exists (i.e., when more than a single Doppler pair is available). This consistency test is designed to screen heading change estimates which are unreliable, as could be caused by reflected signal tracking, or excessive road slope or vertical acceleration (e.g., as could be induced by driving over a speed bump). The consistency check is based on the computation of the sum of the squares of the normalized Doppler measurement residuals. This statistic is compared to a threshold derived from Chi-Square probability tables as represented by box 250. If the threshold be exceeded, the heading change estimate is considered unreliable, and is not used in forming the track measurement. Otherwise, the WLS heading change estimate is considered reliable and can be used in the track error measurement. Accordingly, the Doppler double differences may be used as described above to obtain accurate GPS heading information to be used for estimating the wheel track error according to Eqns. 2 and 3.

To demonstrate the effectiveness of the track calibration method of the present invention, segments of data collected with a test vehicle were processed with the initial value of the track estimate intentionally offset by +/−5% of the true value wheel track variation over vehicle classes. Thus, the smaller initial value would correspond to the smallest vehicle in a given class of vehicles (e.g., a Toyota Tercel vehicle), while the larger initial value would correspond to the largest vehicle, e.g., a Lexus. Given heading changes corresponding to several complete circles, convergence of the estimated value of the wheel track in accordance with the present invention occurred to within 1% of the "nominal" (i.e., manufacturer supplied) value occurred, as summarized in the table below.

TABLE 1

Track Estimation Test Results

| Initial Value (for Track$_{est}$) | Estimated Value (for Track$_{est}$) | True Value (from manufacturer) |
|---|---|---|
| 1.68 meters | 1.615 meters | 1.60 meters |
| 1.52 meters | 1.584 meters | 1.60 meters |

The initial value in Table 1 corresponds to the initial, default value for Track$_{est}$ in each case, and the estimated value corresponds to the final value for Trackest from the track calibration invention (following the three complete circles performed for this test of the invention). The last column represents the best estimate of the actual wheel track, based on information supplied by the manufacturer for this test vehicle (this value is specified by the manufacturer to be accurate to better than 1%). Accordingly, Table 1 provides verification of the effectiveness of the track calibration method of the present invention.

While a preferred embodiment of the present invention is described, it is contemplated that various modifications may be made thereto without departing from the spirit and scope of the present invention. Accordingly, it is intended that the embodiments described be considered only as illustrative of the invention and that the scope of the invention be determined by the claims hereinafter provided.

What is claimed is:

1. A method for calibrating a wheel track of a movable vehicle in which a navigation system is installed, said system including a global positioning satellite (GPS) receiver and a dead reckoning (DR) system, said DR system including sensors coupled to wheels of the movable vehicle, said method comprising the steps of:

estimating an initial value of the wheel track;

determining a heading change derived from said DR system based on said initial estimate for the wheel track of the movable vehicle;

determining a heading change derived from said GPS receiver;

using said heading changes derived from said GPS and DR systems to generate a refined value of said wheel track; and updating said initial value of the wheel track with said refined value.

2. The method of claim 1 wherein said sensors are installed on front wheels of the movable vehicle.

3. The method of claim 1 wherein said sensors are installed on rear wheels of the movable vehicle.

4. The method of claim 1 wherein said sensors are installed on both front and rear wheels of the movable vehicle.

5. The method of claim 1 wherein said step of determining a heading change from said GPS receiver includes differencing successive GPS heading information.

6. The method of claim 1 wherein said step of determining a heading change from said GPS receiver includes using Doppler measurements.

7. A method for calibrating the wheel track of a movable vehicle in which a navigation system is installed, the system including a global positioning satellite (GPS) receiver and a dead reckoning (DR) system, the DR system including sensors coupled to wheels of the movable vehicle, said method comprising the steps of:

estimating an initial value of the wheel track;

determining a heading change using said DR system using said initial value for a wheel track of the movable vehicle;

determining a heading change using said GPS system;

estimating an error in said wheel track using said heading changes as determined from said GPS and DR systems;

refining said error in said wheel track at a predetermined time interval; and updating said initial value of the wheel track with a refined value.

8. The method of claim 7 wherein said refining said error includes filtering successive estimated errors of said wheel track.

9. The method of claim 7 wherein said step of determining a heading change from said GPS receiver includes differencing successive GPS heading information.

10. The method of claim 7 wherein said step of determining a heading change from said GPS receiver includes using Doppler measurements.

11. The method of claim 7 wherein said sensors are installed on front wheels of said movable vehicle.

12. The method of claim 7 wherein said sensors are installed on rear wheels of said movable vehicle.

13. The method of claim 7 wherein said sensors are installed on both front and rear wheels of said movable vehicle.

14. The method of claim 7 wherein said predetermined time interval is one second.

15. An apparatus for estimating a wheel track of a movable vehicle, comprising:

means for storing an initial value for the wheel track;

sensors coupled to wheels of the movable vehicle for determining a first heading of the movable vehicle based upon said initial value for the wheel track of the movable vehicle;

a global positioning satellite (GPS) receiver for determining a second heading of the movable vehicle based upon GPS data; and processing means for receiving said first and second headings and updating said initial value of said wheel track with a refined value.

16. The apparatus of claim 15 wherein processing means includes means for estimating an error in said wheel track using said first and second headings; and refining said error in said wheel track at predetermined time intervals.

17. The apparatus of claim 15 wherein said refining said error includes filtering successive estimated errors of said wheel track.

18. The apparatus of claim 15 wherein said GPS receiver determines said second heading by differencing successive GPS heading data.

19. The apparatus of claim 15 wherein said GPS receiver determines said second heading using Doppler measurements.

20. The apparatus of claim 15 wherein said sensors are coupled to front wheels of said movable vehicle.

21. The apparatus of claim 15 wherein said sensors are coupled to rear wheels of said movable vehicle.

22. The apparatus of claim 15 wherein said sensors are coupled to both front and rear wheels of said movable vehicle.

* * * * *